United States Patent
Okazaki et al.

(10) Patent No.: US 10,252,741 B2
(45) Date of Patent: Apr. 9, 2019

(54) ELECTROSTATIC STEERING WHEEL HOLD DETECTION DEVICE

(71) Applicants: PANASONIC CORPORATION, Osaka (JP); TOYOTA JIDOSHA KABUSHIKI KAISHA, Aichi (JP)

(72) Inventors: Yuta Okazaki, Osaka (JP); Hiroshi Naitou, Osaka (JP); Shinji Fujikawa, Hiroshima (JP); Tsuyoshi Nishio, Chiba (JP); Nobuharu Katsuki, Kyoto (JP); Takeshi Matsumura, Numazu (JP); Hirotada Otake, Susono (JP)

(73) Assignees: PANASONIC CORPORATION, Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 70 days.

(21) Appl. No.: 15/326,313

(22) PCT Filed: May 29, 2015

(86) PCT No.: PCT/JP2015/002734
§ 371 (c)(1),
(2) Date: Jan. 13, 2017

(87) PCT Pub. No.: WO2016/009584
PCT Pub. Date: Jan. 21, 2016

(65) Prior Publication Data
US 2017/0210408 A1    Jul. 27, 2017

(30) Foreign Application Priority Data
Jul. 17, 2014    (JP) ................ 2014-146445

(51) Int. Cl.
*B62D 1/06* (2006.01)
*B62D 1/04* (2006.01)
*G01D 5/24* (2006.01)
*H05B 3/00* (2006.01)

(52) U.S. Cl.
CPC ............... *B62D 1/046* (2013.01); *B62D 1/06* (2013.01); *G01D 5/2405* (2013.01); *H05B 3/0042* (2013.01)

(58) Field of Classification Search
None
See application file for complete search history.

(56) References Cited

U.S. PATENT DOCUMENTS

| | | |
|---|---|---|
| 2005/0239075 A1 | 10/2005 | Yanagidaira et al. |
| 2005/0242965 A1 | 11/2005 | Rieth et al. |

(Continued)

FOREIGN PATENT DOCUMENTS

| | | |
|---|---|---|
| EP | 1 491 409 A1 | 12/2004 |
| EP | 1 611 844 A1 | 1/2006 |

(Continued)

OTHER PUBLICATIONS

International Search Report and Written Opinion issued in International Patent Application No. PCT/JP2015/002734, dated Jun. 23, 2015; with partial English translation.
Extended European Search Report issued in European Patent Application No. 15821656.4, dated Jun. 30, 2017.

*Primary Examiner* — Jermele M Hollington
*Assistant Examiner* — Feba Pothen
(74) *Attorney, Agent, or Firm* — McDermott Will & Emery LLP

(57) ABSTRACT

An electrostatic steering wheel hold detection device includes: a first heater element located in a steering wheel, and has one end electrically connected to a power source; an inductor—that is electrically connected to an other end of the first heater element; a second heater element that is included in the steering wheel, and has one end electrically connected to the other end of the first heater element via the inductor; and a sensor circuit that is electrically connected to a connection point between the first heater element and the (Continued)

inductor, and detects, from a change in capacitance at the connection point, whether or not the steering wheel is held. An other end of the second heater element is electrically connected to a ground. The second heater element is located lower than the first heater element in the steering wheel when the steering wheel is in a neutral position.

8 Claims, 15 Drawing Sheets

(56) References Cited

U.S. PATENT DOCUMENTS

2011/0148648 A1* 6/2011 Fischer et al. ............... 340/686
2013/0127211 A1   5/2013 Aoki

FOREIGN PATENT DOCUMENTS

| EP | 2 028 078 A1 | 2/2009 |
| EP | 2 572 929 A1 | 3/2013 |
| JP | S63-305074 A | 12/1988 |
| JP | 2003-535341 A | 11/2003 |
| JP | 2005-537992 A | 12/2005 |
| JP | 2010023699 A * | 2/2010 |
| JP | 2010-215140 A | 9/2010 |
| WO | 01/92900 A1 | 12/2001 |
| WO | 2012/017900 A1 | 2/2012 |

* cited by examiner

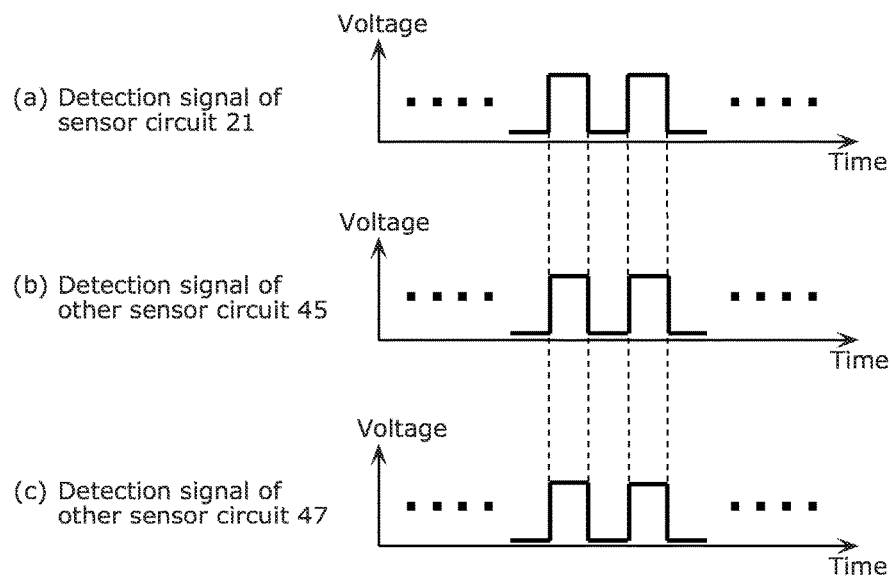
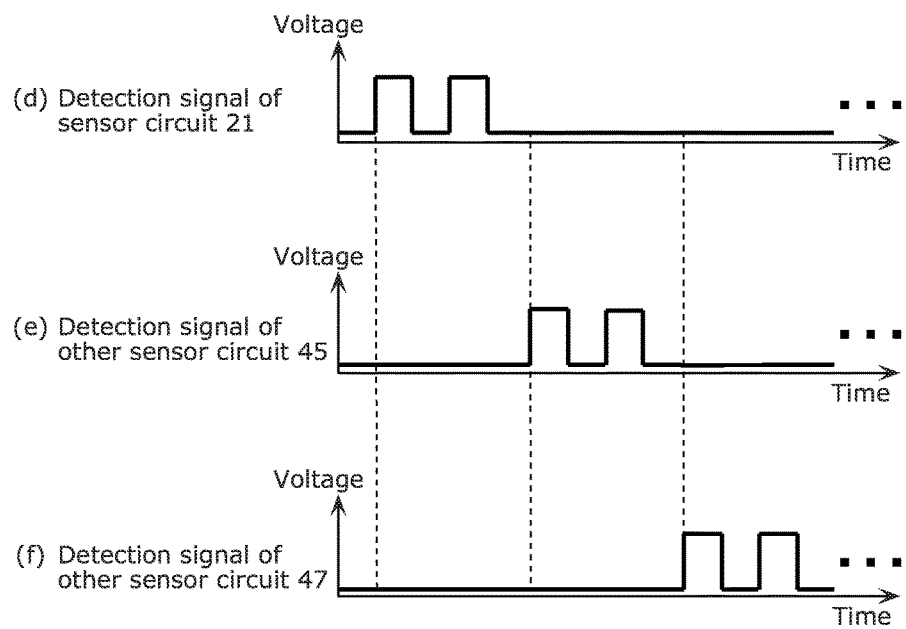

101 Microcomputer
102 Hold detection unit
104 Input buffer
106 Temperature control
107 Bimetal switch
108 Heat wire
109 Relay driver 111,112,113,114 Relay
115,116 Switch
117,118,119,120 Heater 121 Steering wheel
122,123,124,125 Region

ELECTROSTATIC STEERING WHEEL HOLD DETECTION DEVICE

RELATED APPLICATIONS

This application is the U.S. National Phase under 35 U.S.C. § 371 of International Patent Application No. PCT/JP2015/002734, filed on May 29, 2015, which in turn claims the benefit of Japanese Application No. 2014-146445, filed on Jul. 17, 2014, the disclosures of which Applications are incorporated by reference herein.

TECHNICAL FIELD

The present invention relates to an electrostatic steering wheel hold detection device that detects the contact of a person from a change in capacitance.

BACKGROUND ART

Steering wheel heating devices that detect a region of a steering wheel touched by a person and warm the detected region with a heater have been conventionally proposed. FIG. 14 is a block diagram illustrating the structure of a steering wheel heating device of a vehicle disclosed in Patent Literature (PTL) 1. FIG. 15 is a plan view illustrating the appearance of a steering wheel.

In FIG. 14, the steering wheel heating device includes a microcomputer (hereafter referred to as "CPU") 101, a hold detection unit 102, a 0.1 sec timer 103, an input buffer 104, a power unit 105, a temperature control 106, a bimetal switch 107, a heat wire 108, a relay driver 109, relays 111, 112, 113, and 114, switches 115 and 116, and four heaters 117, 118, 119, and 120.

In a steering wheel 121 in FIG. 15, the heaters 117, 118, 119, and 120 are respectively installed in regions 122, 123, 124, and 125 formed by dividing the circumference into quarters.

In the case where the switch 115 is in the "auto" position, for example, the CPU 101 turns on the relay 111 when detecting the driver's hold in the region 122 of the steering wheel 121, and turns on the relay 112 when detecting the driver's hold in the region 123 of the steering wheel 121. In detail, when the driver holds the part of the region 122 of the steering wheel 121, the heater 117 is energized to warm the region 122. When the driver holds the part of the region 123 of the steering wheel 121, the heater 118 is energized to warm the region 123. Since only the heater of the region held by the driver's hand is energized in the steering wheel heating device, the steering wheel 121 is warmed efficiently.

CITATION LIST

Patent Literature

[PTL 1]
Japanese Unexamined Patent Application Publication No. S63-305074

SUMMARY OF INVENTION

Technical Problem

However, the CPU 101 in the conventional technique may falsely detect a hold on the steering wheel when the steering wheel is actually not being held.

Solution to Problem

To solve the problem with the conventional technique, an electrostatic steering wheel hold detection device according to the present invention includes: a first heater element that is located in a steering wheel, and has one end electrically connected to one of a power source and a ground; an inductor that is electrically connected to an other end of the first heater element; a second heater element that is located in the steering wheel, and has one end electrically connected to the other end of the first heater element via the inductor; and a sensor circuit that is electrically connected to a connection point between the first heater element and the inductor, and detects, from a change in capacitance at the connection point, whether or not the steering wheel is held, wherein an other end of the second heater element is electrically connected to an other one of the power source and the ground, and the second heater element is located lower than the first heater element in the steering wheel when the steering wheel is in a neutral position.

Advantageous Effects of Invention

The electrostatic steering wheel hold detection device according to the present invention can reduce the possibility of falsely detecting a hold on the steering wheel when the steering wheel is actually not being held.

BRIEF DESCRIPTION OF DRAWINGS

FIG. 10A is a timing chart illustrating the detection signals of a sensor circuit and other sensor circuits in the electrostatic steering wheel hold detection device in Embodiment 3 of the present invention.

FIG. 10B is a timing chart illustrating the detection signals of the sensor circuit and other sensor circuits in the electrostatic steering wheel hold detection device in Embodiment 3 of the present invention.

DESCRIPTION OF EMBODIMENTS

Figure 14:
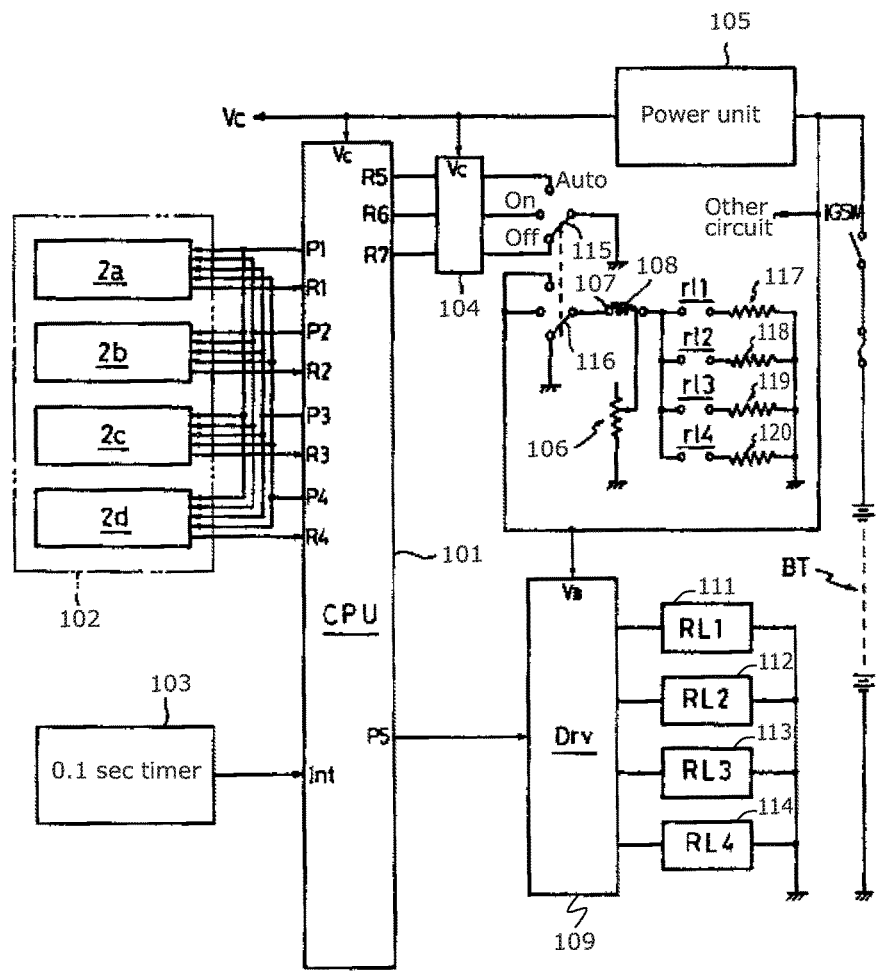
FIG. 14 is a block diagram illustrating the structure of a conventional steering wheel heating device.
Figure 15:
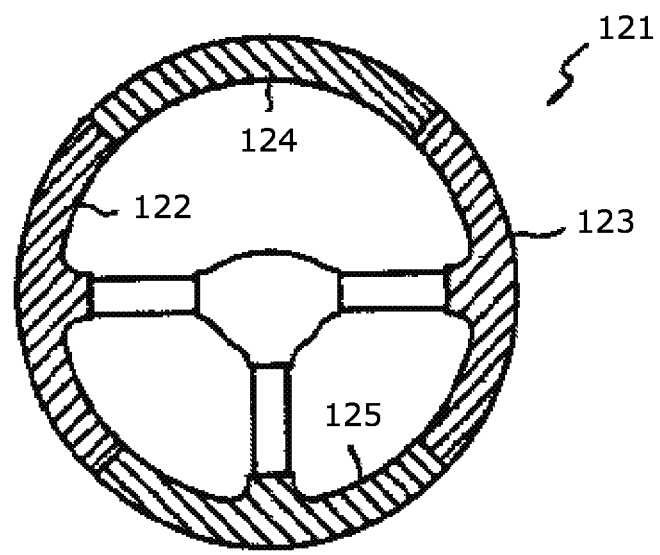
FIG. 15 is a schematic plan view of a conventional steering wheel.

The problem with the conventional structure is described in detail below, prior to the description of embodiments of the present invention. In FIGS. 14 and 15, the heaters 117 to 120 are respectively located in the regions 122 to 125. Accordingly, especially in the case where the steering wheel 121 is in the neutral position where no steering is performed (the position corresponding to the steering angle=0° when the vehicle drives straight), if part of the driver's leg (knee or thigh) approaches the region 125 of the steering wheel 121, the CPU 101 falsely detects that the driver is holding the part of the region 125. In such a case, for example, the heater 120 is turned on and the steering wheel 121 is heated unnecessarily even though the driver is not holding the region 125. The following describes the structure of an electrostatic steering wheel hold detection device that can solve the problem of falsely detecting a hold on the steering wheel when the steering wheel is actually not being held.

Each of the embodiments described below shows a general or specific example. The numerical values, shapes, materials, structural elements, the arrangement and connection of the structural elements, steps, the processing order of the steps etc. shown in the following embodiments are mere examples, and do not limit the scope of the present invention. The present invention is defined by the claims. Of the structural elements in the embodiments described below, the structural elements not recited in any one of the independent claims representing the broadest concepts of the present invention are described as optional structural elements although not necessarily required to achieve the object of the present invention.

Embodiments of the present invention are described below, with reference to drawings.

Embodiment 1

Figure 1:
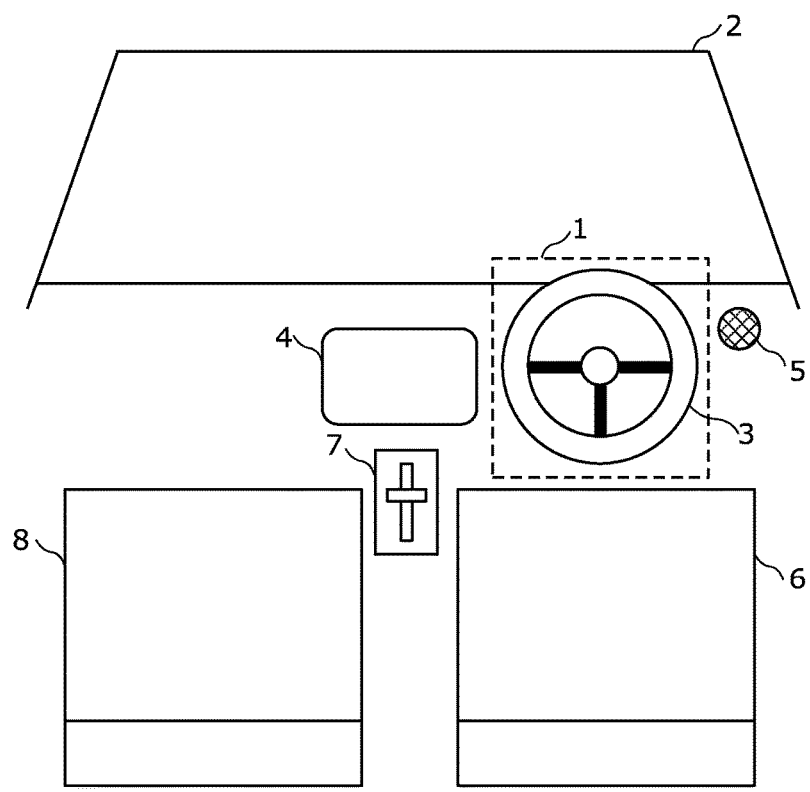
FIG. 1 is a schematic diagram illustrating the inside of a vehicle including an electrostatic steering wheel hold detection device in Embodiment 1 of the present invention.

FIG. 1 is a schematic diagram illustrating the inside of a vehicle including an electrostatic steering wheel hold detection device 1 in Embodiment 1 of the present invention. A steering wheel 3, a display unit 4, and a speaker 5 are arranged near a front window 2. A driver's seat 6 is located near the steering wheel 3, a passenger seat 8 is adjacent to the driver's seat 6, and a shift lever 7 is between the driver's seat 6 and the passenger seat 8.

Figure 2:
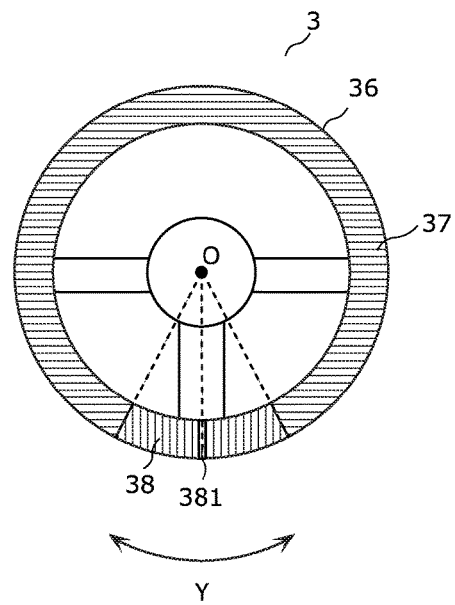
FIG. 2 is a schematic plan view of a steering wheel provided with the electrostatic steering wheel hold detection device in Embodiment 1 of the present invention.

FIG. 2 is a schematic plan view of the steering wheel 3. The steering wheel 3 includes an annular rim 36 held by the driver. The rim 36 includes heater elements for warming the rim 36 (the heater elements are inside the rim 36 and so are not illustrated). When the steering wheel 3 is in the neutral position, the rim 36 is separated into two predetermined regions, i.e. a lower region 38 and an upper region 37 higher than the lower region 38, as indicated by the hatching in FIG. 2. A heater element is included in each of the regions.

The lower region 38 is a region that includes a lowermost part 381 of the steering wheel 3 and extends to both sides in the circumferential direction of the steering wheel 3 (Y direction in FIG. 2), when the steering wheel 3 is in the neutral position. For example, the lower region 38 is a region that extends to both sides in the Y direction by about 20° from the dashed line connecting the center point O and lowermost part 381 of the steering wheel 3. The lower region 38 is a region of the rim 36 near the vehicle floor, and is a region near the driver's legs when the driver is seated on the driver's seat 6.

Figure 3:
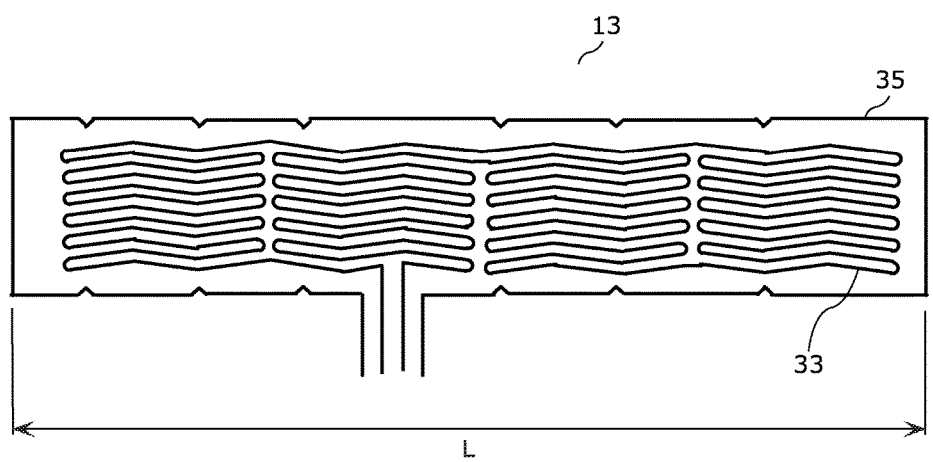
FIG. 3 is a schematic plan view of a heater element in the developed state in the electrostatic steering wheel hold detection device in Embodiment 1 of the present invention.

FIG. 3 is a schematic plan view of a heater element included in the steering wheel 3 in the developed state. The heater element (for example, a first heater element 13 illustrated in FIG. 4) is composed of a heater wire 33 and a base material. The base material is made of non-woven fabric 35. The heater wire 33 is sewn to the non-woven fabric 35 and thus integrated with the non-woven fabric 35. To increase the resistance of the heater wire 33, the heater wire 33 is arranged on the non-woven fabric 35 so as to form a serpentine wiring pattern.

The heater element is installed in each of the upper region 37 and lower region 38 illustrated in FIG. 2. Here, since the lower region 38 is narrower than the upper region 37, the length (L) of the heater element buried in the upper region 37 is greater than that of the heater element buried in the lower region 38. Each heater element is placed in the rim 36 of the steering wheel 3 so that the length direction of the heater element coincides with the circumferential direction (Y direction) of the steering wheel 3.

Figure 4:
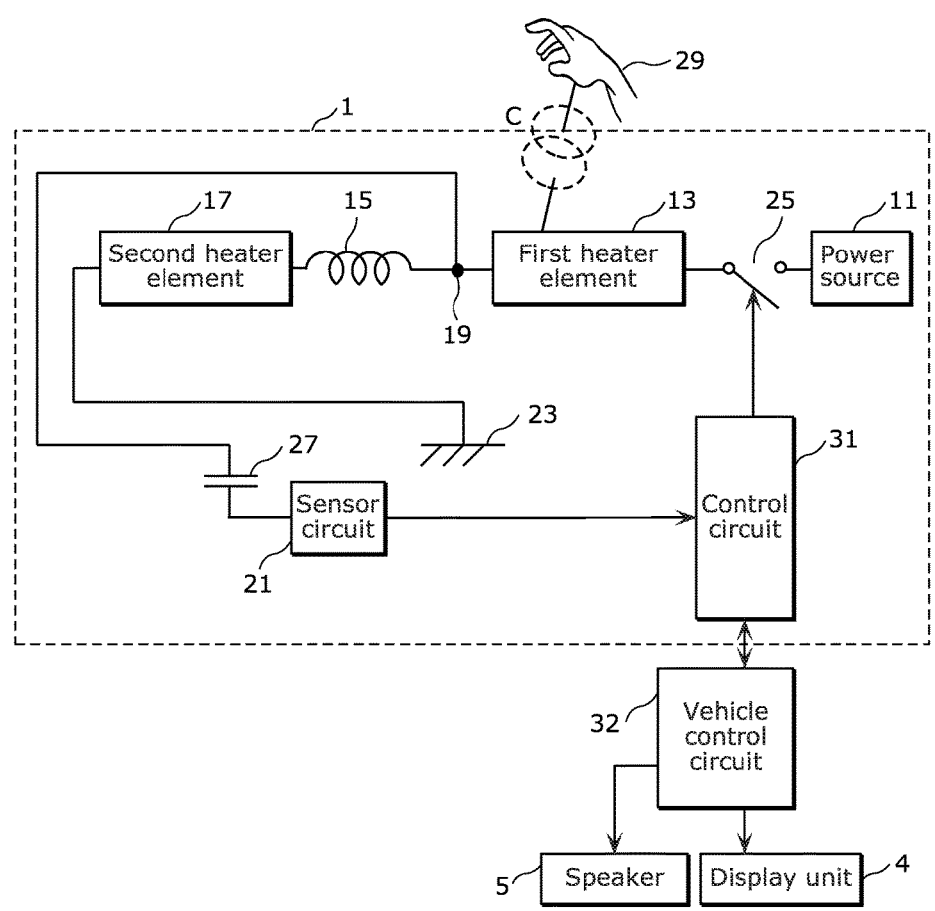
FIG. 4 is a block circuit diagram illustrating the electrostatic steering wheel hold detection device and its peripheral circuitry in Embodiment 1 of the present invention.

FIG. 4 is a block circuit diagram illustrating the electrostatic steering wheel hold detection device 1 and its peripheral circuitry in Embodiment 1. In FIG. 4, the first heater element 13 is the heater element located in the upper region 37 of the rim 36, and a second heater element 17 is the heater element located in the lower region 38 of the rim 36. Accordingly, when the steering wheel 3 is in the neutral position, the second heater element 17 is located lower than the first heater element 13 in the steering wheel 3. The first heater element 13 is longer than the second heater element 17.

One end of the first heater element 13 is electrically connected to a power source 11 via a switch 25. For example, the power source 11 is a vehicle battery. The switch 25 is composed of a relay or semiconductor switch which is turned on or off according to an external signal, and controls the power supply to the first heater element 13 and the second heater element 17. When the switch 25 is turned on in response to the driver's operation, power is supplied from the power source 11 to the first heater element 13 and the second heater element 17, and the rim 36 is warmed.

The other end of the first heater element 13 is electrically connected to one end of the second heater element 17 via an inductor 15. The first heater element 13, the inductor 15, and the second heater element 17 are thus connected in series. The other end of the second heater element 17 is connected to a ground 23. A sensor circuit 21 is electrically connected to a connection point 19 between the first heater element 13 and the inductor 15, via a capacitor 27. The sensor circuit 21 detects a change in capacitance C between the driver's hand 29 and the first heater element 13 when the hand 29 approaches the first heater element 13 and holds the steering wheel 3.

In Embodiment 1, the sensor circuit 21 determines, by an analog circuit (comparator), whether or not the steering wheel 3 is held (hold determination), and outputs the result to a control circuit 31 as a hold signal. In detail, the sensor circuit 21 outputs the hold signal of high level in the case where the hand 29 is holding the steering wheel 3, and outputs the hold signal of low level in the case where the hand 29 is not in contact with the steering wheel 3 or the driver's leg is in proximity to the steering wheel 3.

Alternatively, the sensor circuit 21 may simply output an analog signal obtained by voltage-converting the change in capacitance C, without performing the hold determination. In this case, the control circuit 31 performs the hold determination.

The inductor 15 is described below. The first heater element 13 and the second heater element 17 each operate as a heater using DC power from the power source 11. Meanwhile, the sensor circuit 21 detects the capacitance C using an AC signal, and so the inductor 15 is necessary. The inductor 15 needs to have low DC resistance, and have sufficiently high impedance with respect to the AC signal generated by the sensor circuit 21. Suppose the drive frequency of the sensor circuit 21 is about 10 MHz and the equivalent capacitance value of each heater element is about 100 pF. For grounding with the same level of impedance, the inductor 15 of about 2.5 pH is selected as an example.

The control circuit 31 includes a microcomputer and peripheral circuitry including memory, and controls on and off of the switch 25. Moreover, upon receiving the signal (hold signal of low level) indicating that the hand 29 is not holding the steering wheel 3 from the sensor circuit 21, the control circuit 31 instructs a vehicle control circuit 32 to warn the driver.

The vehicle control circuit 32 is a control circuit that is installed in the vehicle and controls the whole vehicle, and includes a microcomputer and peripheral circuitry. The vehicle control circuit 32 is connected to the display unit 4 and the speaker 5, and warns the driver through the display unit 4 and the speaker 5 in response to the instruction signal from the control circuit 31. Signals such as a signal for turning on or off the switch 25 and a signal for the below-mentioned warning are transferred between the control circuit 31 and the vehicle control circuit 32.

Figure 5:
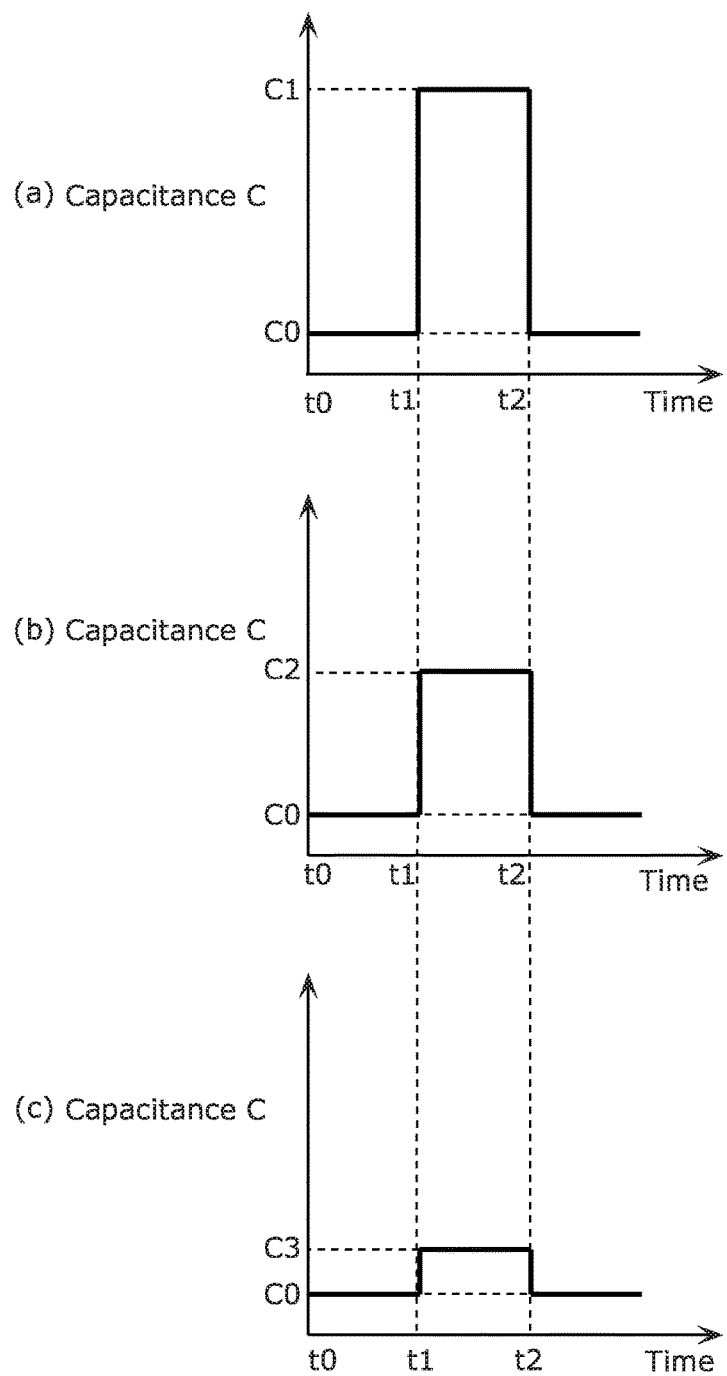
FIG. 5 is a diagram illustrating capacitance changes detected by the electrostatic steering wheel hold detection device in Embodiment 1 of the present invention.

The operation of the electrostatic steering wheel hold detection device 1 is described below, with reference to FIG. 5. FIG. 5 illustrates the capacitance changes of the heater elements in the electrostatic steering wheel hold detection device 1 in Embodiment 1. In each graph in FIG. 5, the horizontal axis represents time, and the vertical axis represents the capacitance C detected by the sensor circuit 21.

(a) in FIG. 5 illustrates the change of the capacitance C before and after the hand 29 holds the upper region 37 in which the first heater element 13 is buried. From time t0 to time t1, the hand 29 is not near the steering wheel 3. In this case, the capacitance C between the hand 29 and the first heater element 13 remains at reference capacitance C0. At time t1, the hand 29 holds the part of the upper region 37 in which the first heater element 13 is buried. The capacitance C accordingly changes to high capacitance C1 higher than the reference capacitance C0.

From time t1 to time t2 during which the hand 29 keeps holding the upper region 37, the capacitance C is maintained at the high capacitance C1. When the hand 29 moves away from the steering wheel 3 at time t2, the capacitance C returns to the reference capacitance C0. Based on such a change in capacitance C, for example, the sensor circuit 21 can determine that the hand 29 is holding the steering wheel 3 if the capacitance C is the high capacitance C1.

(b) in FIG. 5 illustrates the change of the capacitance C before and after the hand 29 holds the lower region 38 in which the second heater element 17 is buried. From time t0 to time t1, the hand 29 is not holding the steering wheel 3, as in (a) in FIG. 5. At time t1, the hand 29 holds the part of the lower region 38 in which the second heater element 17 is buried. The capacitance C accordingly changes, but only to low capacitance C2 lower than the high capacitance C1.

When the hand 29 moves away from the steering wheel 3 at time t2, the capacitance C returns to the reference capacitance C0. The magnitude of the capacitance C when the hand 29 is holding the steering wheel 3 is different from that in (a) in FIG. 5. In other words, the change of the capacitance C is smaller in the second heater element 17 than in the first heater element 13. Since the sensor circuit 21 detects, via the inductor 15, the capacitance C of the second heater element 17 connected to the ground 23, the sensor circuit 21 has lower sensitivity to the capacitance C of the second heater element 17.

(c) in FIG. 5 illustrates the change of the capacitance C before and after the driver's leg approaches the lower region 38. From time t0 to time t1, the leg is not near the steering wheel 3. When the leg approaches the steering wheel 3 at time t1, the capacitance C changes, but only to extremely low capacitance C3 which is slightly higher than the reference capacitance C0 and is lower than the low capacitance C2. When the leg moves away from the steering wheel 3 at time t2, the capacitance C returns to the reference capacitance C0. The change of the capacitance C in the case where the leg approaches the steering wheel 3 is smaller than the change in (b) in FIG. 5. Hence, the sensor circuit 21 can determine that the hand 29 is not holding the steering wheel 3 even when the leg approaches the steering wheel 3, because the sensitivity of the sensor circuit 21 to the capacitance C is low.

Thus, the sensor circuit 21 monitors in an analogue manner how much the capacitance C has changed and, when the capacitance C has changed to the high capacitance C1 or the low capacitance C2, determines that the hand 29 is holding the steering wheel 3. The sensor circuit 21 then outputs the hold signal of high level to the control circuit 31. If the capacitance C has changed only to the extremely low capacitance C3, the sensor circuit 21 determines that the knee or thigh of the driver's leg has approached the steering wheel 3, and outputs the hold signal of low level to the control circuit 31. This reduces false detection in the sensor circuit 21 caused by the approach of the driver's leg.

The operation of the control circuit 31 is described below, with reference to a flowchart in FIG. 6. The flowchart in FIG. 6 illustrates a subroutine executed at regular time intervals (e.g. 1 second) during vehicle running from a main routine (not illustrated) of the microcomputer in the control circuit 31.

Figure 6:
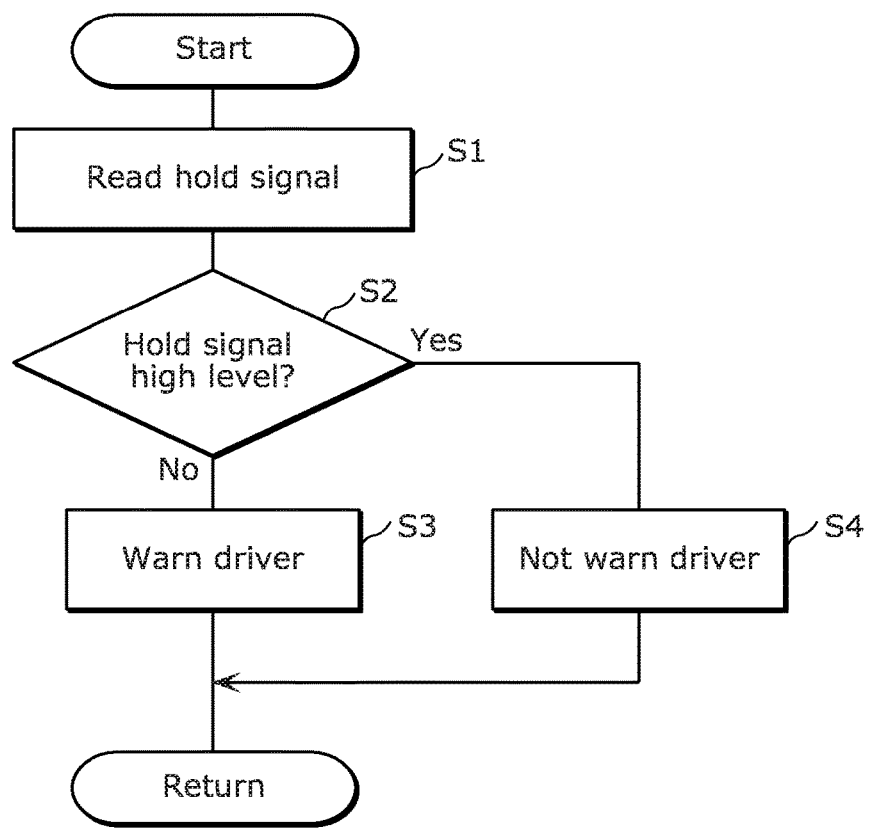
FIG. 6 is a flowchart illustrating the operation of a control circuit in the electrostatic steering wheel hold detection device in Embodiment 1 of the present invention.

When the subroutine in FIG. 6 is executed, the control circuit 31 reads the hold signal from the sensor circuit 21 (Step S1). The control circuit 31 then determines whether or not the hold signal is high level (Step S2). If the hold signal is low level (Step S2: No), the control circuit 31 determines that the driver is not holding the steering wheel 3, and outputs an instruction signal to warn the driver to the vehicle control circuit 32 (Step S3). Upon receiving the instruction signal, the vehicle control circuit 32 displays a warning on the display unit 4, and outputs a warning sound from the speaker 5. The control circuit 31 then ends the subroutine in FIG. 6, and returns to the main routine.

If the hold signal is high level in Step S2 (Step S2: Yes), the control circuit 31 determines that the driver is holding the steering wheel 3 by at least one hand, and does not warn the driver (Step S4). In detail, the control circuit 31 outputs an instruction signal not to warn the driver, to the vehicle control circuit 32. The vehicle control circuit 32 accordingly does not warn the driver. The control circuit 31 then ends the subroutine in FIG. 6, and returns to the main routine.

By repeating such operation at regular time intervals, false detection caused by the driver's leg is reduced, and whether or not the driver is holding the steering wheel 3 is determined promptly. Although the regular time intervals are set to 1 second here, the present invention is not limited to such. However, if the regular time intervals are longer than 1 second, the possibility of a delay in warning increases. If the regular time intervals are shorter than 1 second, the driver is likely to be warned more frequently, and the possibility of the driver feeling annoyed increases. Therefore, the regular time intervals are desirably about 1 second.

A predetermined threshold may be set between the low capacitance C2 and the extremely low capacitance C3, with the sensor circuit 21 determining that the hand 29 is holding the steering wheel 3 if the capacitance C has changed to the threshold or more. In this case, the sensor circuit 21 only needs to determine the capacitance C based on one threshold, which simplifies the structure of the sensor circuit 21.

As mentioned earlier, the change of the capacitance C is small in the case where the hand 29 is holding the lower region 38 in which the second heater element 17 is buried, too. Hence, the length of the lower region 38 in the circumferential direction is desirably shortened to such an extent that can reduce false detection caused by the driver's leg, as illustrated in FIG. 2.

With the aforementioned structure and operation, the second heater element 17 is connected to the sensor circuit 21 via the inductor 15, and so the capacitance change of the second heater element 17 due to the approach of the human body, when seen from the connection point 19 of the sensor circuit 21, is very low. Therefore, by burying the second heater element 17 in the lower region 38 of the steering wheel 3 to be approached by the driver's leg, the electrostatic steering wheel hold detection device 1 can reduce the influence of the leg (knee or thigh) on the output of the sensor circuit 21.

Although the first heater element 13 is longer than the second heater element 17 in Embodiment 1, the first heater element 13 may be of the same length as or shorter than the second heater element 17. In such a case, the range in which a hold by the hand 29 is detected decreases, but the range in which false detection caused by the driver's leg is reduced increases. For example, in the case where a projection indicating each steady-state position for the driver's hold by the hand 29 (10:10 position in an analog clock) is provided on the surface of the rim 36, the hand 29 is highly likely to be at the position of the projection unless the driver turns the steering wheel 3. Such a structure that gives more priority to the reduction of false detection caused by the driver's leg can be used in this case.

Although the sensor circuit 21 is an analog circuit in Embodiment 1, the sensor circuit 21 may be a digital circuit.

Although the driver is warned through the warning display on the display unit 4 and the warning sound from the speaker 5 in Embodiment 1, the driver may be warned through either the display unit 4 or the speaker 5. To enhance safety, however, the warning is desirably made from both the display unit 4 and the speaker 5.

Although the first heater element 13 and the second heater element 17 are each formed using the independent non-woven fabric 35 in Embodiment 1, two heater wires 33 may be arranged on single non-woven fabric 35 to form the first heater element 13 and the second heater element 17. In this case, only the single non-woven fabric 35 is used, which simplifies the structure of each heater element.

Although the sensor circuit 21 and the control circuit 31 are separate units in Embodiment 1, the sensor circuit 21 may be included in the control circuit 31. This simplifies the circuit structure.

Although the power source 11 is electrically connected to the one end of the first heater element 13 and the ground 23 is electrically connected to the other end of the second heater element 17 in Embodiment 1, the power source 11 and the ground 23 may be connected in an opposite manner. In detail, the ground 23 may be electrically connected to the one end of the first heater element 13, and the power source 11 electrically connected to the other end of the second heater element 17. With such a structure, too, the sensitivity of the sensor circuit 21 to the capacitance C in the first heater element 13 is higher than the sensitivity of the sensor circuit 21 to the capacitance C in the second heater element 17. Thus, any structure in which one of the power source 11 and ground 23 is electrically connected to the one end of the first heater element 13 and the other one of the power source 11 and ground 23 is electrically connected to the other end of the second heater element 17 may be used.

Although the switch 25 is electrically connected on the power source 11 side in Embodiment 1, the switch 25 may be connected on the ground 23 side, or connected on both the power source 11 side and the ground 23 side.

Embodiment 2

The following describes an electrostatic steering wheel hold detection device 1 in Embodiment 2 of the present invention in detail. In Embodiment 2, the same structural elements as those in Embodiment 1 are given the same reference signs, and their detailed description is omitted.

Figure 7:
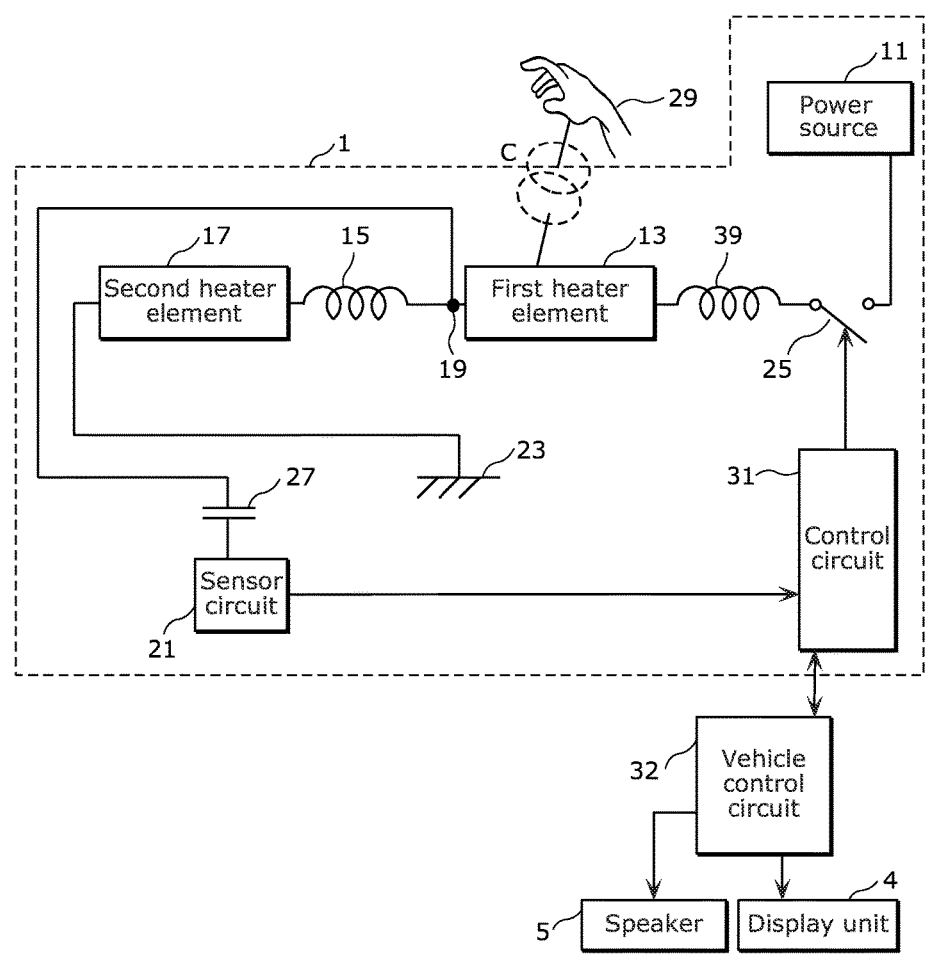
FIG. 7 is a block circuit diagram illustrating an electrostatic steering wheel hold detection device and its peripheral circuitry in Embodiment 2 of the present invention.

FIG. 7 is a block circuit diagram illustrating the electrostatic steering wheel hold detection device 1 and its peripheral circuitry in Embodiment 2 of the present invention. This embodiment is characterized in that another inductor 39 is provided between the first heater element 13 and the power source 11. This reduces the influence of the power source 11 that can be regarded as the ground in an alternating current way, when the sensor circuit 21 detects the capacitance C. As a result, the sensor circuit 21 can distinguish the hold by the hand 29 and the approach of the leg from each other with higher accuracy.

As illustrated in FIG. 7, the other inductor 39 is electrically connected between the first heater element 13 and the switch 25. The switch 25 is connected to the power source 11. Hence, the other inductor 39 is electrically connected between the first heater element 13 and the power source 11.

With such a structure, the influence of the power source 11 on the detection of the capacitance C is reduced by the other inductor 39, when seen from the entrance (the connection point 19) of the sensor circuit 21. Since the influence of the power source 11 on the detection of the capacitance of the first heater element 13 is reduced, the sensor circuit 21 can detect the capacitance C more accurately. Meanwhile, the change of the capacitance C of the second heater element 17 is the same as that in Embodiment 1, so that false detection caused by the driver's leg can be reduced.

With the aforementioned structure and operation, the influence of the power source 11 that can be regarded as the ground in an alternating current way can be reduced when the sensor circuit 21 detects the capacitance C. As a result, the sensor circuit 21 can distinguish the hold by the hand 29 and the approach of the leg from each other with higher accuracy. In Embodiment 2, the power source 11 and the ground 23 may be connected in an opposite manner, as in Embodiment 1. In such a case, the other inductor 39 is provided between the first heater element 13 and the ground 23. Embodiment 2 is thus characterized in that the other inductor 39 is provided between the first heater element 13 and one of the power source 11 and ground 23.

Embodiment 3

The following describes an electrostatic steering wheel hold detection device 1 in Embodiment 3 of the present invention in detail. In Embodiment 3, the same structural elements as those in Embodiment 1 are given the same reference signs, and their detailed description is omitted.

Figure 8:
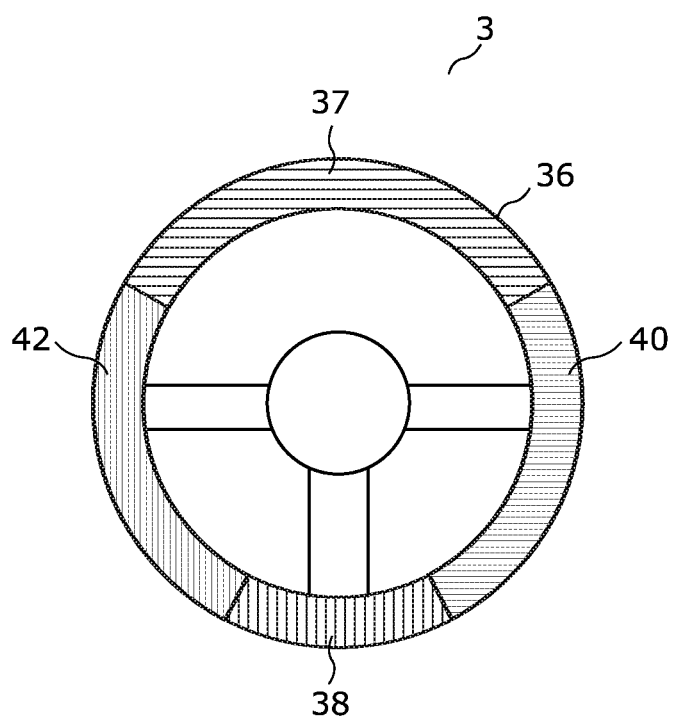
FIG. 8 is a schematic plan view of a steering wheel provided with an electrostatic steering wheel hold detection device in Embodiment 3 of the present invention.
Figure 9:
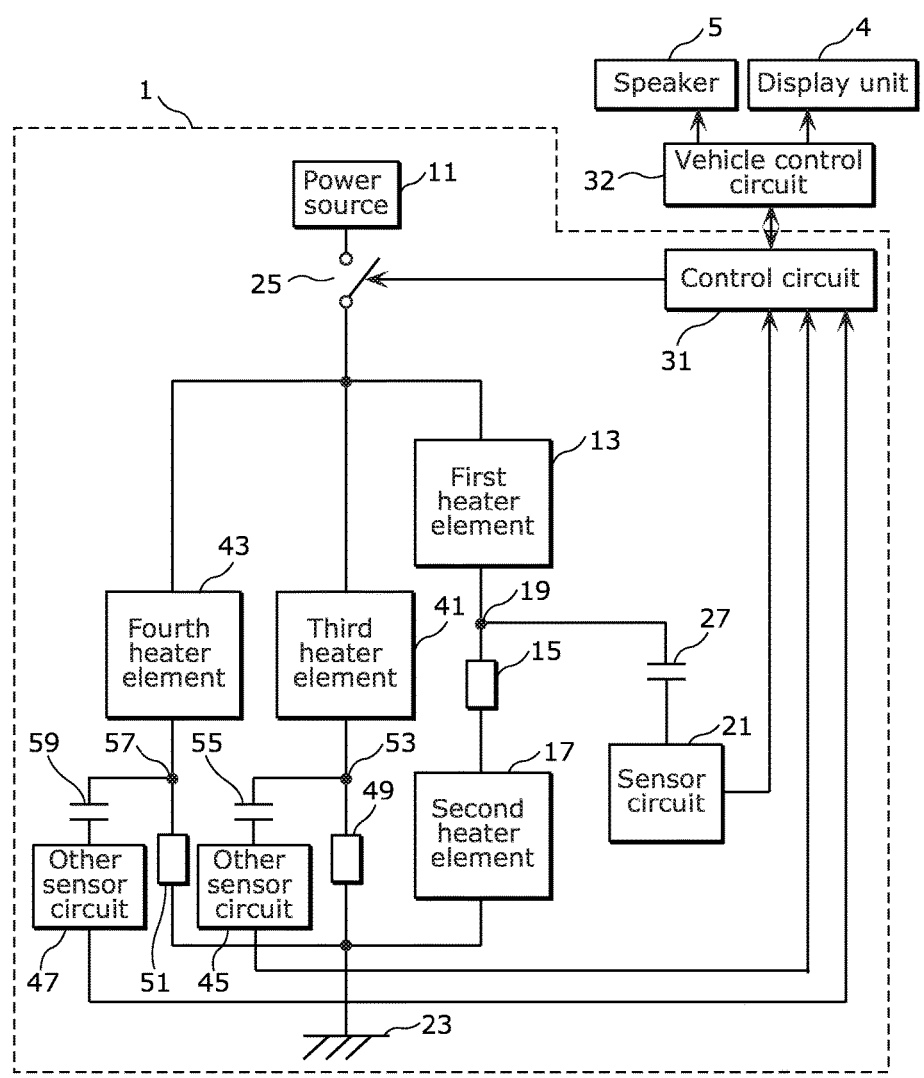
FIG. 9 is a block circuit diagram illustrating the electrostatic steering wheel hold detection device and its peripheral circuitry in Embodiment 3 of the present invention.

FIG. 8 is a schematic plan view of the steering wheel 3 provided with the electrostatic steering wheel hold detection device 1 in Embodiment 3 of the present invention. FIG. 9 is a block circuit diagram illustrating the electrostatic steering wheel hold detection device 1 and its peripheral circuitry in Embodiment 3 of the present invention.

When the steering wheel 3 is in the neutral position, the rim 36 is separated into four predetermined regions, i.e. a lower region 38, an upper region 37, a right region 40, and a left region 42, as indicated by the hatching in FIG. 8. A heater element is included in each of the regions. The heater element in the upper region 37 is a first heater element 13, and the heater element in the lower region 38 is a second heater element 17.

The second heater element 17 is thus situated near the driver's legs when the driver is seated on the driver's seat 6. In addition, a third heater element 41 and a fourth heater element 43 are respectively located in the right region 40 and the left region 42 on the right and left of the steering wheel 3, as other heater elements. The third heater element 41 and the fourth heater element 43 each have the same structure as that illustrated in FIG. 3 in Embodiment 1.

The circuit structure of the electrostatic steering wheel hold detection device 1 in the case where the heater elements are arranged in the steering wheel 3 as illustrated in FIG. 8 is described below, with reference to FIG. 9. The circuit structure around the first heater element 13 and the second heater element 17 is the same as that in FIG. 4 in Embodiment 1. Another inductor 49 is connected in series with the third heater element 41. Another sensor circuit 45 is electrically connected to a connection point 53 between the third heater element 41 and the other inductor 49, via another capacitor 55. The other sensor circuit 45 is also electrically connected to the control circuit 31, and outputs a hold signal for the right region 40 to the control circuit 31.

Another inductor 51 is connected in series with the fourth heater element 43. Another sensor circuit 47 is electrically connected to a connection point 57 between the fourth heater element 43 and the other inductor 51, via another capacitor 59. The other sensor circuit 47 is also electrically connected to the control circuit 31, and outputs a hold signal for the left region 42 to the control circuit 31.

Embodiment 3 is thus characterized in that another heater element (the third heater element 41 (the fourth heater element 43)) is located in the rim 36 of the steering wheel 3, one end of the other heater element 41 (43) is electrically connected to one of the power source 11 and ground 23, the other end of the other heater element 41 (43) is electrically connected to another sensor element 45 (47) and one end of another inductor 49 (51), and the other end of the other inductor 49 (51) is electrically connected to the other one of the power source 11 and ground 23. Since each sensor circuit for detecting a hold in the corresponding region of the rim 36 outputs a hold signal using the heater unit located in the region, the position at which the driver is holding the steering wheel 3 can be recognized while reducing the influence of the driver's leg.

The operation of the control circuit 31 is basically the same as that in FIG. 6. In detail, in the high level determination on the hold signal in Step S2, the control circuit 31 performs the high level determination on the hold signal of the right region 40 and the hold signal of the left region 42. If the hold signal of each of the regions is not high level, the control circuit 31 issues a warning. If the hold signal of at least one of the right region 40 and left region 42 is high level, the control circuit 31 does not issue a warning (Step S4). By determining which region corresponds to a high level hold signal, the control circuit 31 can recognize the position at which the hand 29 is holding the steering wheel 3. Based on this, the control circuit 31 can urge the driver to hold the right and left of the steering wheel 3 by both hands while the vehicle is driving straight.

With the aforementioned structure and operation, the electrostatic steering wheel hold detection device 1 can recognize the position at which the driver is holding the steering wheel 3 while reducing the influence of the driver's leg.

Although the first heater element 13 is located in the upper region 37 of the steering wheel 3 in Embodiment 3, the fourth heater element 43 may instead be located in the upper region 37. Moreover, the third heater element 41 and the fourth heater element 43 may be interchanged. In such cases, too, the same advantageous effects as in Embodiment 3 can be achieved.

Although the number of other heater elements is two in Embodiment 3, the number of other heater elements may be one, or three or more. In the case where the number of other heater elements is one, the number of regions for detecting the position of the hand 29 by the control circuit 31 is smaller, but the circuit structure is simpler than in FIG. 9. In the case where the number of other heater elements is three or more, the circuit structure is more complex, but the number of regions for detecting the position of the hand 29 by the control circuit 31 is greater.

In Embodiment 3, too, an inductor may be connected on the power source 11 side as in Embodiment 2.

In Embodiment 3, the signals (detection signals) output from the sensor circuit 21 and the other sensor circuits 45 and 47 to detect the capacitance C are desirably synchronized or time-shared. This structure is described in detail below.

FIG. 10A is a timing chart of the detection signals output from the sensor circuit 21 and other sensor circuits 45 and 47. For example, the sensor circuit 21 and the other sensor circuits 45 and 47 output the rectangular wave signals illustrated in FIG. 10A, to detect a hold by the hand 29. The frequency is, for example, 10 MHz as mentioned earlier.

The state where the detection signals of the sensor circuit 21 and other sensor circuits 45 and 47 are synchronized is the state where the three detection signals are output at the same timing as illustrated in FIG. 10A. (a) in FIG. 10A is a timing chart of the detection signal of the sensor circuit 21. (b) in FIG. 10A is a timing chart of the detection signal of the other sensor circuit 45. (c) in FIG. 10A is a timing chart of the detection signal of the other sensor circuit 47.

Especially in the case where the sensor circuit 21 and the other sensor circuits 45 and 47 are near each other, such synchronization can reduce the reciprocal influence between these sensor circuits.

To reduce the reciprocal influence, the sensor circuit 21 and the other sensor circuits 45 and 47 may be operated in a time-sharing manner instead of being synchronized. FIG. 10B illustrates an example of this operation. (d) in FIG. 10B is a timing chart of the detection signal of the sensor circuit 21. (e) in FIG. 10B is a timing chart of the detection signal of the other sensor circuit 45. (f) in FIG. 10B is a timing chart of the detection signal of the other sensor circuit 47. In FIG. 10B, the detection signal of the sensor circuit 21 is output first, while the detection signals of the other sensor circuits 45 and 47 are not output. After this, the detection signal of the other sensor circuit 45 is output, while the detection signals of the sensor circuit 21 and other sensor circuit 47 are not output. After this, the detection signal of the other sensor circuit 47 is output, while the detection signals of the sensor circuit 21 and other sensor circuit 45 are not output. Especially in the case where the sensor circuit 21 and the other sensor circuits 45 and 47 are near each other, repeatedly performing such operation can also reduce the reciprocal influence.

Figure 10C:
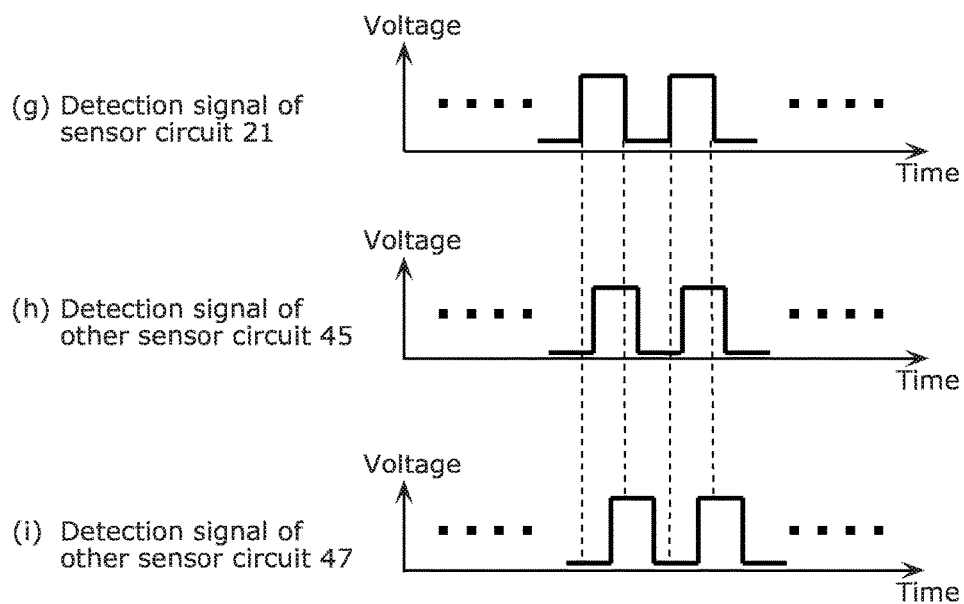
FIG. 10C is a timing chart illustrating the detection signals of the sensor circuit and other sensor circuits in the electrostatic steering wheel hold detection device in Embodiment 3 of the present invention.

FIG. 10C is a timing chart in the case where the detection signals are not synchronous. (g) in FIG. 10C is a timing chart of the detection signal of the sensor circuit 21. (h) in FIG. 10C is a timing chart of the detection signal of the other sensor circuit 45. (i) in FIG. 10C is a timing chart of the detection signal of the other sensor circuit 47. In FIG. 10C, the detection signals are output at different timings. In such a case, if the sensor circuit 21 and the other sensor circuits 45 and 47 are apart from each other, a hold by the hand 29 can be detected adequately. If the sensor circuit 21 and the other sensor circuits 45 and 47 are near each other, on the other hand, each sensor circuit is influenced by the signals of the other sensor circuits, which can lead to false detection. Hence, the detection signals may be synchronized or time-shared in the case where the sensor circuit 21 and the other sensor circuits 45 and 47 are near each other.

Embodiment 4

The following describes an electrostatic steering wheel hold detection device 1 in Embodiment 4 of the present invention in detail. In Embodiment 4, the same structural elements as those in Embodiment 1 or 3 are given the same reference signs, and their detailed description is omitted.

Figure 11:
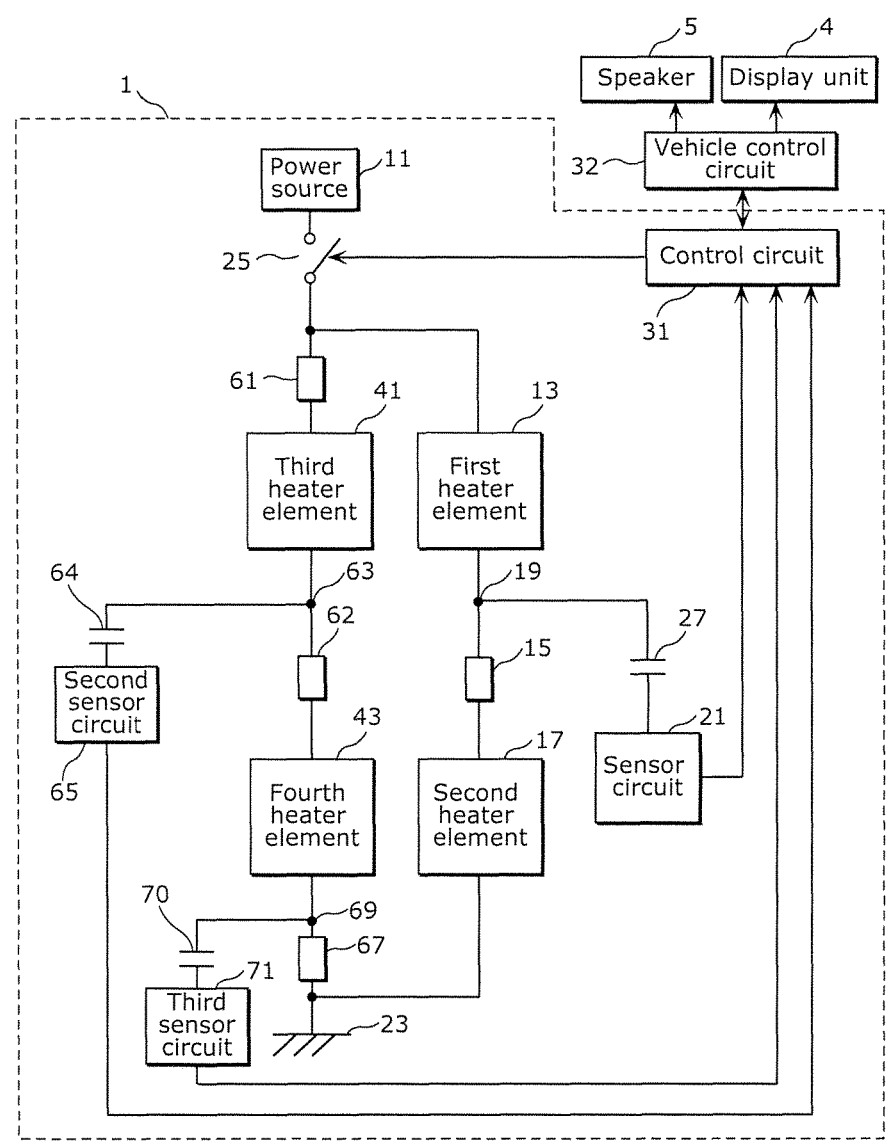
FIG. 11 is a block circuit diagram illustrating an electrostatic steering wheel hold detection device and its peripheral circuitry in Embodiment 4 of the present invention.

FIG. 11 is a block circuit diagram illustrating the electrostatic steering wheel hold detection device 1 and its peripheral circuitry in Embodiment 4 of the present invention. The circuit structure around the first heater element 13 and the second heater element 17 is the same as that in FIG. 4 in Embodiment 1. As illustrated in FIG. 11, one end (the power source 11 side) of the third heater element 41 is electrically connected to an inductor 61. The other end of the third heater element 41 is electrically connected to one end of the fourth heater element 43 via a second inductor 62. The third heater element 41 and the fourth heater element 43 are thus connected in series via the second inductor 62. The third heater element 41 and the fourth heater element 43 each have the same structure as that illustrated in FIG. 3 in Embodiment 1.

A second sensor circuit 65 is electrically connected to a first connection point 63 between the third heater element 41 and the second inductor 62 via a first capacitor 64. The second sensor circuit 65 has the same circuit structure as the sensor circuit 21. The second sensor circuit 65 is also electrically connected to the control circuit 31, and outputs a first hold signal to the control circuit 31.

The reason for connecting the second inductor 62 between the third heater element 41 and the fourth heater element 43 is to reduce the influence of a change in capacitance C of the fourth heater element 43 when the second sensor circuit 65 detects the capacitance C.

The other end of the fourth heater element 43 is electrically connected to one end of a third inductor 67. The other end of the third inductor 67 is electrically connected to the ground 23, as illustrated in FIG. 11. A third sensor circuit 71 is electrically connected to a second connection point 69 between the fourth heater element 43 and the third inductor 67 via a second capacitor 70. The third sensor circuit 71 has the same circuit structure as the second sensor circuit 65. The third sensor circuit 71 is also electrically connected to the control circuit 31, and outputs a second hold signal to the control circuit 31.

The first heater element 13, the second heater element 17, the third heater element 41, and the fourth heater element 43 are respectively located in the upper region 37, lower region 38, right region 40, and left region 42 of the rim 36, as in FIG. 8 in Embodiment 3.

Embodiment 4 is thus characterized in that the third heater element 41 and fourth heater element 43 located in the rim 36 of the steering wheel 3 are further included. The third heater element 41 is electrically connected to one of the power source 11 and ground 23, and the third heater element 41 and the fourth heater element 43 are connected in series via the second inductor 62. The second sensor circuit 65 is electrically connected to the first connection point 63 between the third heater element 41 and the fourth heater element 43. The other end of the fourth heater element 43 is electrically connected to the other one of the power source 11 and ground 23 via the second inductor 67. The third sensor circuit 71 is electrically connected to the second connection point 69 between the fourth heater element 43 and the third inductor 67. Since each sensor circuit for detecting a hold in the corresponding region of the rim 36 outputs a hold signal using the heater unit located in the region, the position at which the driver is holding the steering wheel 3 can be recognized while reducing the influence of the driver's leg.

The operation of the control circuit 31 in the electrostatic steering wheel hold detection device 1 in Embodiment 4 is described below. The first heater element 13 and the second heater element 17 have the same structures as those in Embodiment 1, and so operate in the same way. Accordingly, the control circuit 31 can obtain a hold signal from which the influence of the driver's leg has been reduced.

The operation of the control circuit 31 is basically the same as that in the flowchart in FIG. 6. In the high level determination on the hold signal in Step S2, the control circuit 31 performs the high level determination on the first hold signal of the right region 40 (the output of the second sensor circuit 65) and the second hold signal of the left region 42 (the output of the third sensor circuit 71), as in Embodiment 3. The control circuit 31 thus determines whether or not to warn the driver. The control circuit 31 can also recognize the position at which the hand 29 is holding the steering wheel 3.

While the third heater element 41 and the fourth heater element 43 are connected in series, the inductor 61 and the third inductor 67 are connected at the positions near the DC sources (the power source 11 and the ground 23) when seen respectively from the first connection point 63 of the second sensor circuit 65 and the second connection point 69 of the third sensor circuit 71. This reduces the influence of the DC sources on the first hold signal and the second hold signal, as a result of which the position at which the hand 29 is holding the steering wheel 3 can be detected more accurately. In Embodiment 3, the third heater element 41 and the fourth heater element 43 are connected in parallel. However, even when the third heater element 41 and the fourth heater element 43 are connected in series as in Embodiment 4, the position at which the hand 29 is holding the steering wheel 3 can be detected with high accuracy.

Although the third heater element 41 and the fourth heater element 43 are respectively located in the right region 40 and left region 42 of the steering wheel 3, any of these heater elements may be interchanged with the first heater element 13. As an example, the first heater element 13 may be located in the right region 40, and the third heater element 41 located in the upper region 37. As another example, the first heater element 13 may be located in the left region 42, and the fourth heater element 43 located in the upper region 37. Alternatively, the third heater element 41 and the fourth heater element 43 may be interchanged.

Although the inductor 61 is provided in Embodiment 4, the inductor 61 may be omitted.

In Embodiment 4, the detection signals of the sensor circuit 21, second sensor circuit 65, and third sensor circuit 71 are desirably synchronized or time-shared. Such a structure can reduce the reciprocal influence in the case where the sensor circuit 21, the second sensor circuit 65, and the third sensor circuit 71 are near each other.

Embodiment 5

The following describes an electrostatic steering wheel hold detection device 1 in Embodiment 5 of the present invention in detail. In Embodiment 5, the same structural elements as those in Embodiment 1 or 3 are given the same reference signs, and their detailed description is omitted.

Figure 12:
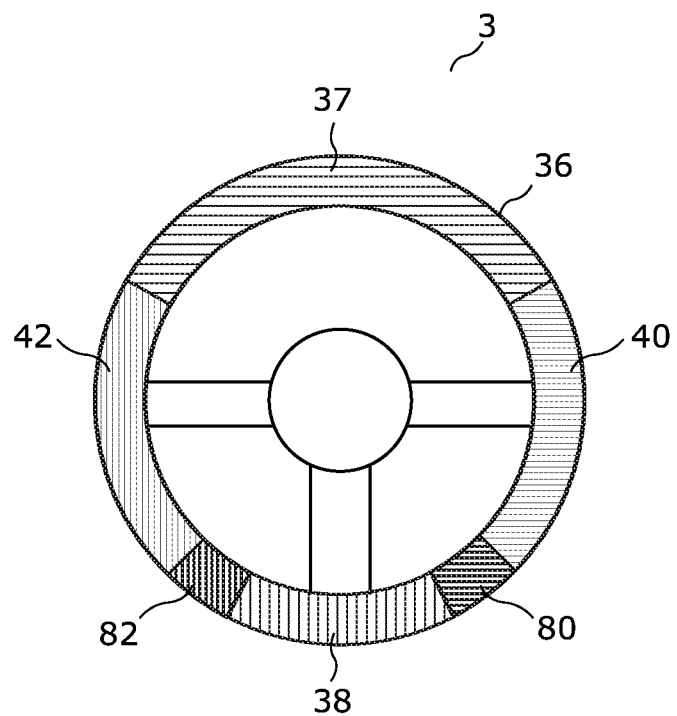
FIG. 12 is a schematic plan view of a steering wheel provided with an electrostatic steering wheel hold detection device in Embodiment 5 of the present invention.
Figure 13:
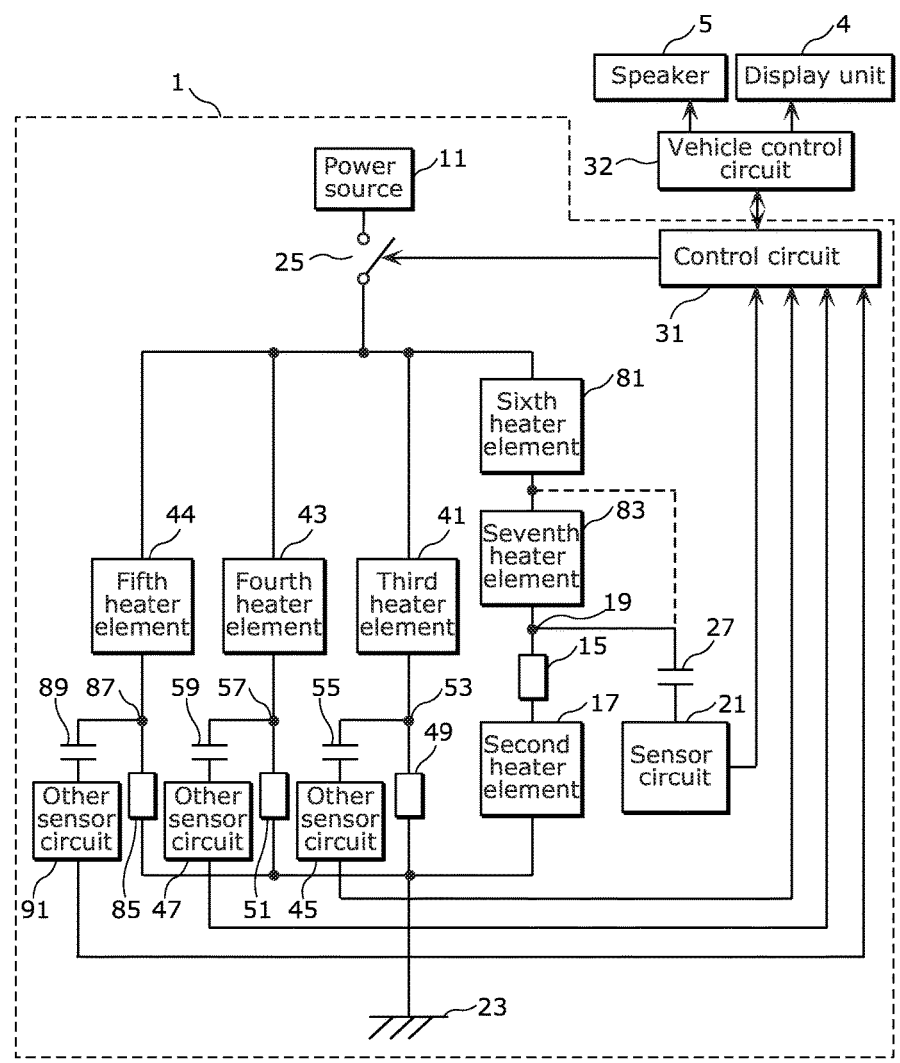
FIG. 13 is a block circuit diagram illustrating the electrostatic steering wheel hold detection device and its peripheral circuitry in Embodiment 5 of the present invention.

FIG. 12 is a schematic plan view of the steering wheel 3 provided with the electrostatic steering wheel hold detection device in Embodiment 5 of the present invention. FIG. 13 is a block circuit diagram illustrating the electrostatic steering wheel hold detection device 1 and its peripheral circuitry in Embodiment 5 of the present invention.

When the steering wheel 3 is in the neutral position, the rim 36 is separated into six predetermined regions, i.e. a lower region 38, an upper region 37, a right region 40, a left region 42, a lower right region 80, and a lower left region 82, as indicated by the hatching in FIG. 12. A heater element is included in each of the regions. The heater element in the upper region 37 is a fifth heater element 44, and the heater element in the lower region 38 is a second heater element 17. The second heater element 17 is thus situated near the driver's legs when the driver is seated on the driver's seat 6. In addition, a third heater element 41 is located in the right region 40, and a fourth heater element 43 is located in the left region 42. Further, a sixth heater element 81 is located in the lower right region 80, and a seventh heater element 83 is located in the lower left region 82. The second heater element 17 is located between the sixth heater element 81 and the seventh heater element 83 on the lower side of the steering wheel 3. The sixth heater element 81 and the seventh heater element 83 each have the same structure as that illustrated in FIG. 3 in Embodiment 1.

The circuit structure of the electrostatic steering wheel hold detection device 1 in the case where the heater elements are arranged in the steering wheel 3 as illustrated in FIG. 12 is described below, with reference to FIG. 13. In FIG. 13, the fifth heater element 44 is connected in parallel with the third heater element 41 and the fourth heater element 43. Another inductor 85 is connected to the fifth heater element 44, like the third heater element 41 or the fourth heater element 43. Another sensor circuit 91 is connected to a connection point 87 between the fifth heater element 44 and the other inductor 85 via another capacitor 89. The other sensor circuit 91 is also connected to the control circuit 31.

In the part in which the first heater element 13 is connected in FIG. 9 in Embodiment 3, a series circuit of the sixth heater element 81 and seventh heater element 83 is connected. The sixth heater element 81, the seventh heater element 83, and the second heater element 17 are thus connected in series.

In other words, as compared with Embodiment 3, Embodiment 5 is characterized in that the fifth heater element 44 is connected in parallel with the third heater element 41 and the fourth heater element 43, and the series circuit of the sixth heater element 81 and seventh heater element 83 is connected to the second heater element 17. As illustrated in FIG. 12, the second heater element 17 (the lower region 38) is located between the sixth heater element 81 (the lower right region 80) and the seventh heater element 83 (the lower left region 82). Hence, the second heater element 17 provided to reduce false detection caused by the driver's leg can be made as small as possible.

Since the sixth heater element 81 and the seventh heater element 83 are located in the part in which the first heater element 13 is located in Embodiment 3, the sensitivity of the sensor circuit 21 to the capacitance C in the sixth heater element 81 and seventh heater element 83 is higher than the sensitivity of the sensor circuit 21 to the capacitance C in the second heater element 17. Accordingly, increasing the lengths of the sixth heater element 81 and seventh heater element 83 makes it possible to provide the second heater element 17 only in the part necessary to reduce false detection caused by the driver's leg.

In the circuit structure in FIG. 13, which of the lower right region 80 provided with the sixth heater element 81 and the lower left region 82 provided with the seventh heater element 83 is being held cannot be distinguished. This is because the length of each of the lower right region 80 and lower left region 82 is shorter than the length of any of the upper region 37, right region 40, and left region 42 as illustrated in FIG. 12 and so there is little need to distinguish a hold on the lower right region 80 and a hold on the lower left region 82 from each other. However, which region is being held can be distinguished by connecting each of the first sensor circuit 65 and second sensor circuit 71 to the series circuit of the sixth heater element 81 and seventh heater element 83 as illustrated in FIG. 11 in Embodiment 4.

The connection point 19 to which the sensor circuit 21 is connected may be located between the sixth heater element 81 and the seventh heater element 83, as indicated by the dashed line in FIG. 13. In this case, the sensitivity of the sensor circuit 21 to the capacitance C in each of the sixth heater element 81 and seventh heater element 83 is more uniform.

In Embodiment 5, the detection signals of the sensor circuit 21 and other sensor circuits 45, 47, and 91 are desirably synchronized or time-shared. Such a structure can reduce the reciprocal influence in the case where the sensor circuit 21 and the other sensor circuits 45, 47, and 91 are near each other.

In Embodiments 3 to 5, the power source 11 and the ground 23 may be connected in an opposite manner, as described in Embodiment 1. The same advantageous effects as described in Embodiments 3 to 5 can be achieved even in such a case.

In Embodiments 2 to 5, the switch 25 may be connected on the ground 23 side, or connected on both the power source 11 side and the ground 23 side, as described in Embodiment 1.

Although the plurality of heater elements are separate units in Embodiments 2 to 5, the heater elements may be formed in single non-woven fabric 35 as described in Embodiment 1. This simplifies the structure of each heater element.

Although the heater wire 33 is sewn to the non-woven fabric 35 in Embodiments 1 to 5, the present invention is not limited to such. For example, the heater wire 33 may be formed by printing a conductor on a flexible resin substrate used as a base material. The heater wire 33 can be formed easily in this way.

An electrostatic steering wheel hold detection device according to a first aspect of the present invention includes: a first heater element that is located in a steering wheel, and has one end electrically connected to one of a power source and a ground; an inductor that is electrically connected to an other end of the first heater element; a second heater element that is located in the steering wheel, and has one end electrically connected to the other end of the first heater element via the inductor; and a sensor circuit that is electrically connected to a connection point between the first heater element and the inductor, and detects, from a change in capacitance at the connection point, whether or not the steering wheel is held, wherein an other end of the second heater element is electrically connected to an other one of the power source and the ground, and the second heater element is located lower than the first heater element in the steering wheel when the steering wheel is in a neutral position.

An electrostatic steering wheel hold detection device according to a second aspect of the present invention is the electrostatic steering wheel hold detection device according to the first aspect wherein the second heater element is located in a region that includes a lowermost part of the steering wheel and extends to both sides in a circumferential direction of the steering wheel when the steering wheel is in the neutral position.

An electrostatic steering wheel hold detection device according to a third aspect of the present invention is the electrostatic steering wheel hold detection device according to the second aspect wherein a length of the first heater element in the circumferential direction is greater than a length of the second heater element in the circumferential direction.

An electrostatic steering wheel hold detection device according to a fourth aspect of the present invention is the electrostatic steering wheel hold detection device according to any one of the first to third aspects wherein an other inductor is connected between the first heater element and the one of the power source and the ground.

An electrostatic steering wheel hold detection device according to a fifth aspect of the present invention is the electrostatic steering wheel hold detection device according to the first aspect further including an other heater element located in the steering wheel, wherein one end of the other heater element is electrically connected to the one of the power source and the ground, an other end of the other heater element is electrically connected to an other sensor circuit and one end of an other inductor, and an other end of the other inductor is electrically connected to the other one of the power source and the ground.

An electrostatic steering wheel hold detection device according to a sixth aspect of the present invention is the electrostatic steering wheel hold detection device according to the first aspect further including a third heater element and a fourth heater element located in the steering wheel, wherein the third heater element is electrically connected to the one of the power source and the ground, the third heater element and the fourth heater element are connected in series via a first inductor, a first sensor circuit is electrically connected to a first connection point between the third heater element and the first inductor, an other end of the fourth heater element is electrically connected to the other one of the power source and the ground via a second inductor, and a second sensor circuit is electrically connected to a second connection point between the fourth heater element and the second inductor.

INDUSTRIAL APPLICABILITY

An electrostatic steering wheel hold detection device according to the present invention can reduce the possibility of false detection caused by the driver's leg, and therefore is particularly useful as an electrostatic steering wheel hold detection device for a vehicle and the like.

The invention claimed is:

1. An electrostatic steering wheel hold detection device comprising:
    a first heater element that is located in a steering wheel, and has a first end electrically connected to one of a power source and a ground;
    an inductor that is electrically connected to a second end of the first heater element;
    a second heater element that is located in the steering wheel, and has a first end electrically connected to the second end of the first heater element via the inductor; and
    a sensor circuit that is electrically connected to a connection point between the first heater element and the inductor, and detects, from a change in capacitance at the connection point, whether or not the steering wheel is held,
    wherein a second end of the second heater element is electrically connected to the one of the power source and the ground to which the first end of the first heater element is not connected,
    the second heater element is located lower than the first heater element in the steering wheel when the steering wheel is in a neutral position, and
    a third heater element located in the steering wheel,
    wherein a first end of the third heater element is electrically connected to the one of the power source and the ground to which the first end of the first heater element is connected, a second end of the third heater element is electrically connected to a second sensor circuit and a first end of a second inductor, and a second end of the second inductor is electrically connected to the one of the power source and the ground to which the first end of the first heater element is not connected.

2. The electrostatic steering wheel hold detection device according to claim 1, wherein the second heater element is located in a region that includes a lowermost part of the steering wheel and extends to both sides in a circumferential direction of the steering wheel when the steering wheel is in the neutral position.

3. The electrostatic steering wheel hold detection device according to claim 2, wherein a length of the first heater element in the circumferential direction is greater than a length of the second heater element in the circumferential direction.

4. The electrostatic steering wheel hold detection device according to claim 1, wherein a second inductor is connected between the first heater element and the one of the power source and the ground to which the first end of the first heater element is connected.

5. An electrostatic steering wheel hold detection device comprising:
   a first heater element that is located in a steering wheel, and has a first end electrically connected to one of a power source and a ground;
   an inductor that is electrically connected to a second end of the first heater element;
   a second heater element that is located in the steering wheel, and has a first end electrically connected to the second end of the first heater element via the inductor; and
   a sensor circuit that is electrically connected to a connection point between the first heater element and the inductor, and detects, from a change in capacitance at the connection point, whether or not the steering wheel is held,
   wherein a second end of the second heater element is electrically connected to the one of the power source and the ground to which the first end of the first heater element is not connected,
   the second heater element is located lower than the first heater element in the steering wheel when the steering wheel is in a neutral position, and
   a third heater element and a fourth heater element located in the steering wheel,
   wherein the third heater element is electrically connected to the one of the power source and the ground to which the first end of the first heater element is connected, the third heater element and the fourth heater element are connected in series via a second inductor, a second sensor circuit is electrically connected to a first connection point between the third heater element and the second inductor, a first end of the fourth heater element is electrically connected to the one of the power source and the ground to which the first end of the first heater element is not connected via a third inductor, and a third sensor circuit is electrically connected to a second connection point between the fourth heater element and the third inductor.

6. The electrostatic steering wheel hold detection device according to claim 5, wherein the second heater element is located in a region that includes a lowermost part of the steering wheel and extends to both sides in a circumferential direction of the steering wheel when the steering wheel is in the neutral position.

7. The electrostatic steering wheel hold detection device according to claim 6, wherein a length of the first heater element in the circumferential direction is greater than a length of the second heater element in the circumferential direction.

8. The electrostatic steering wheel hold detection device according to claim 5, wherein a fourth inductor is connected between the first heater element and the one of the power source and the ground to which the first end of the first heater element is connected.

* * * * *